(12) United States Patent
Yashima (10) Patent No.: US 9,981,473 B2
(45) Date of Patent: May 29, 2018

(54) DRIVING DEVICE OF LIQUID DROPLET DISCHARGING HEAD, PRINTER, AND NON-TRANSITORY COMPUTER READABLE MEDIUM

(71) Applicant: FUJI XEROX CO., LTD., Tokyo (JP)

(72) Inventor: Satoshi Yashima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 345 days.

(21) Appl. No.: 14/836,038

(22) Filed: Aug. 26, 2015

(65) Prior Publication Data

US 2016/0257120 A1 Sep. 8, 2016

(30) Foreign Application Priority Data

Mar. 2, 2015 (JP) .................. 2015-040341

(51) Int. Cl.
| | |
|---|---|
| *B41J 2/165* | (2006.01) |
| *B33Y 30/00* | (2015.01) |
| *B33Y 50/02* | (2015.01) |
| *B41J 2/07* | (2006.01) |
| *B41J 2/17* | (2006.01) |
| *B41J 2/045* | (2006.01) |
| *B41J 11/00* | (2006.01) |
| *B29C 64/112* | (2017.01) |
| *B29C 64/386* | (2017.01) |

(52) U.S. Cl.
CPC .............. *B41J 2/165* (2013.01); *B29C 64/112* (2017.08); *B29C 64/386* (2017.08); *B33Y 30/00* (2014.12); *B33Y 50/02* (2014.12); *B41J 2/04581* (2013.01); *B41J 2/04588* (2013.01); *B41J 2/04593* (2013.01); *B41J 2/04596* (2013.01); *B41J 2/07* (2013.01); *B41J 2/17* (2013.01); *B41J 11/002* (2013.01)

(58) Field of Classification Search
CPC ......................... B41J 2/165; B41J 200/16502
See application file for complete search history.

(56) References Cited

U.S. PATENT DOCUMENTS

| | | | |
|---|---|---|---|
| 2003/0011670 A1* | 1/2003 | Shirakawa | ............. B41J 11/002 347/102 |
| 2011/0164080 A1* | 7/2011 | Ring | .................... B41J 2/16517 347/9 |

FOREIGN PATENT DOCUMENTS

| | | |
|---|---|---|
| JP | 2004-230640 A | 8/2004 |
| JP | 2008-296374 A | 12/2008 |
| JP | 2009-101515 A | 5/2009 |

* cited by examiner

*Primary Examiner* — Ryan Ochylski
(74) *Attorney, Agent, or Firm* — Oliff PLC (57) ABSTRACT

Provided is a driving device of a liquid droplet discharging head including a driving unit that drives a liquid droplet discharging head which includes plural nozzles, which discharge an ultraviolet ray curable liquid, as liquid droplets, the ultraviolet ray curable liquid being cured by being irradiated with ultraviolet rays, and a control unit that controls the driving unit so that, among the plural nozzles, a draw-in driving signal for drawing the liquid in from a discharge surface of non-discharge nozzles of the liquid droplets is supplied to the non-discharge nozzles while ultraviolet rays from an ultraviolet ray light source, which irradiates liquid droplets discharged from the liquid droplet discharging head with ultraviolet rays, are being emitted.

9 Claims, 13 Drawing Sheets

DRIVING DEVICE OF LIQUID DROPLET DISCHARGING HEAD, PRINTER, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-040341 filed Mar. 2, 2015.

BACKGROUND

Technical Field

The present invention relates to a driving device of a liquid droplet discharging head, a printer, and a non-transitory computer readable medium.

SUMMARY

According to an aspect of the invention, there is provided a driving device of a liquid droplet discharging head including:
a driving unit that drives a liquid droplet discharging head which includes plural nozzles, which discharge an ultraviolet ray curable liquid, as liquid droplets, the ultraviolet ray curable liquid being cured by being irradiated with ultraviolet rays; and
a control unit that controls the driving unit so that, among the plural nozzles, a draw-in driving signal for drawing the liquid in from a discharge surface of non-discharge nozzles of the liquid droplets is supplied to the non-discharge nozzles while ultraviolet rays from an ultraviolet ray light source, which irradiates liquid droplets discharged from the liquid droplet discharging head with ultraviolet rays, are being emitted.

BRIEF DESCRIPTION OF THE DRAWINGS

Exemplary embodiments of the present invention will be described in detail based on the following figures, wherein.

DETAILED DESCRIPTION

Hereinafter, an exemplary embodiment will be described with reference to the drawings. In the exemplary embodiment, a case in which the present exemplary embodiment is applied to a 3D printer that forms a three-dimensional shaped product is described.

Figure 1:
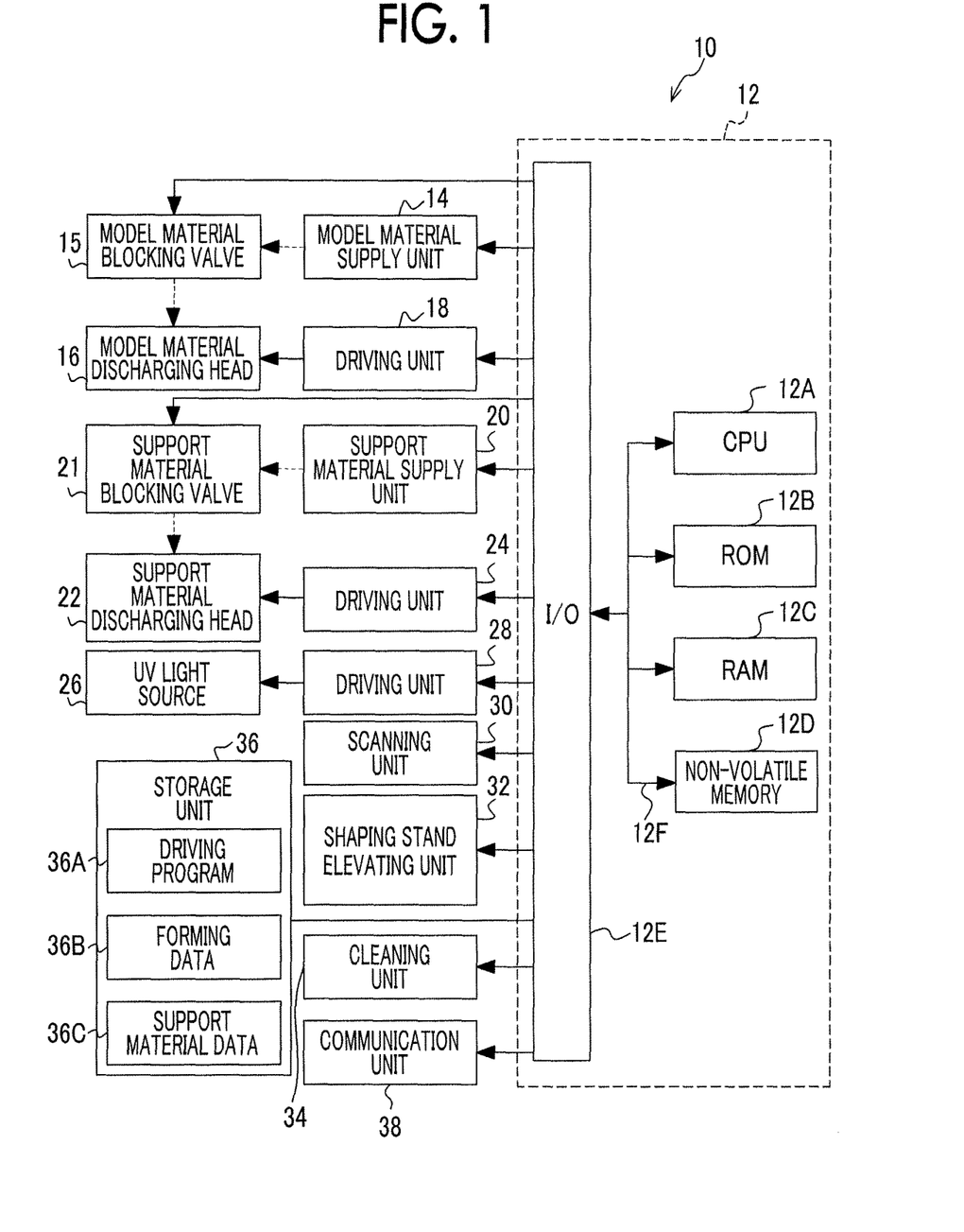
FIG. 1 is a block diagram of a 3D printer.

FIG. 1 shows a block diagram of a 3D printer 10 of the exemplary embodiment. As shown in FIG. 1, the 3D printer 10 is configured to include a controller 12.

The controller 12 has a configuration in which a Central Processing Unit (CPU) 12A, a Read Only Memory (ROM) 12B, a Random Access Memory (RAM) 12C, a non-volatile memory 12D, and an input/output interface (I/O) 12E are respectively connected via a bus 12F.

Functional unit such as a model material supply unit 14, a driving unit 18 that drives a model material discharging head 16, a support material supply unit 20, a driving unit 24 that drives a support material discharging head 22, a driving unit 28 that drives a UV light source 26, a scanning unit 30, a shaping stand elevating unit 32, a cleaning unit 34, a storage unit 36, a communication unit 38 are connected to the I/O 12E.

The model material supply unit 14 accommodates a model material for forming a three-dimensional shaped product, and supplies a model material to the model material discharging head 16 when a model material blocking valve 15 opens. Additionally, an arrow that is shown by a dotted line in FIG. 1 represents a supply pathway of the model material.

The model material is configured by a UV curable type resin or the like that has a property of being cured when irradiated with UV (Ultra Violet) light, that is, when irradiated with ultraviolet rays. More specifically, for example, a molded article forming agent in which a monomer and a urethane oligomer 1 are polymerized using a polymerization initiator, is used as the model material. For example, isobornyl acrylate and 2-hydroxy-3-phenoxy propyl acrylate are used as the monomer. In addition, for example, a substance in which 2,4-tolylene diisocyanate is reacted with hydroxyethyl acrylate, is used as the urethane oligomer 1. In addition, for example, 1-hydroxycyclohexyl phenyl ketone is used as the polymerization initiator.

The model material discharging head 16 is driven by the driving unit 18, and discharges the model material that is supplied from the model material supply unit 14 as liquid droplets.

The driving unit 18 drives the model material discharging head 16 in accordance with instructions from the CPU 12A.

The support material supply unit 20 accommodates a support material for supporting a three-dimensional shaped product, and supplies a support material to the support material discharging head 22 when a support material blocking valve 21 opens. Additionally, an arrow that is shown by a dotted line in FIG. 1 represents a supply pathway of the support material.

The support material is configured by a UV curable type resin that has a property of being cured when irradiated with UV light in the same manner as the model material. However, since the support material is removed after the formation of the three-dimensional shaped product, the support material is configured by a material that is easy to peel off in comparison with the model material. That is, the support material is configured by a material in which the strength when cured through irradiation with UV light is lower than that of the model material. More specifically, for example, a substance in which a monomer, multiple kinds of polypropylene glycol (PPG) with different number average molecular weights (Mn) and phenothiazine are polymerized using a polymerization initiator, is used as the support material. For example, N-hydroxy acrylamide is used as the monomer. In addition, for example, a PPG with an Mn of approximately 400 and a PPG with an Mn of approximately 1000 are used as the multiple kinds of PPG. In addition, for example, 1-hydroxycyclohexyl phenyl ketone is used as the polymerization initiator. For example, this kind of support material is dissolved and removed through immersion in water for a few hours after the completion of the formation of the three-dimensional shaped product.

The support material discharging head 22 is driven by the driving unit 24, and discharges the support material that is supplied from the support material supply unit 20 as liquid droplets.

The driving unit 24 drives the support material discharging head 22 in accordance with instructions from the CPU 12A.

The UV light source 26 irradiates the model material that is discharged from the model material discharging head 16, and the support material that is discharged from the support material discharging head 22 with UV light in a Z axis direction, thereby curing the model material and the support material. For example, an LED, a mercury lamp, a xenon lamp, a halogen lamp, a metal halide lamp, or the like is used as the UV light source 26, but the directionality of an LED is higher than that of other light sources. Therefore, it is preferable that an LED be used as the UV light source 26 in order to achieve device miniaturization by reducing a distance between the model material discharging head 16 and the UV light source 26.

The driving unit 28 drives the UV light source 26 in accordance with instructions from the CPU 12A.

Figure 2:
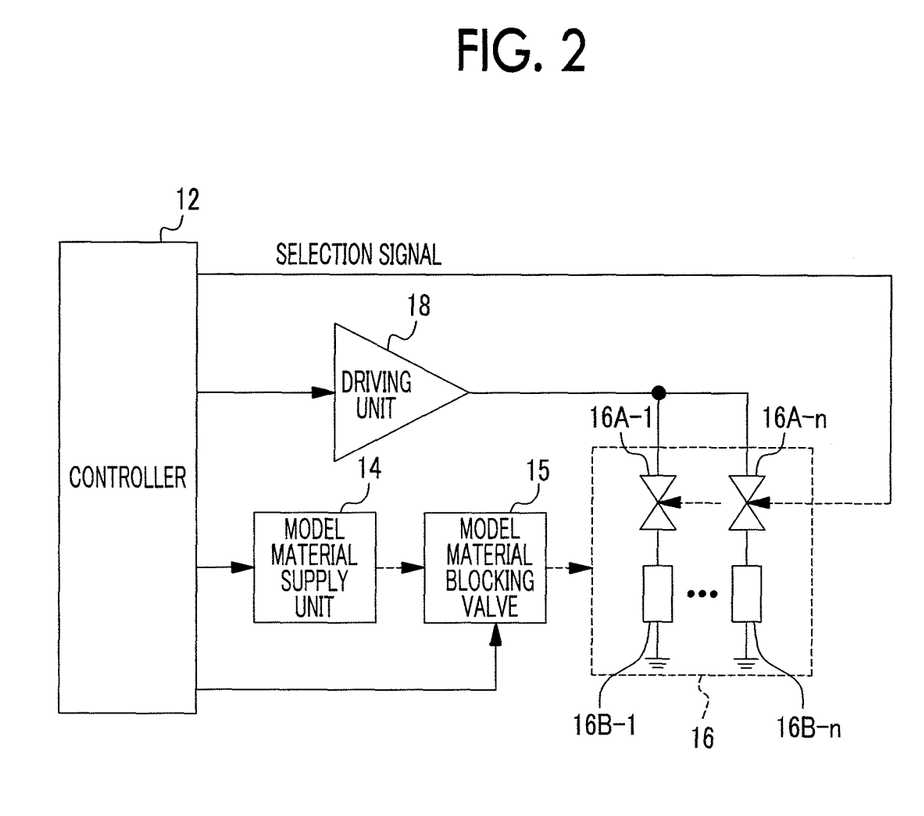
FIG. 2 is a configuration drawing of a model material discharging head.

FIG. 2 shows a specific configuration of the model material discharging head 16. As shown in FIG. 2, the model material discharging head 16 is provided with switch ICs 16A-1 to 16A-n and piezo elements 16B-1 to 16B-n corresponding to a nozzle number n (n is a natural number). Additionally, in the following description, the switch ICs 16A-1 to 16A-n will simply be referred to as the switch ICs 16A in cases in which it is not necessary to discriminate between the switch ICs 16A-1 to 16A-n. In addition, the piezo elements 16B-1 to 16B-n will simply be referred to as the piezo elements 16B in cases in which it is not necessary to discriminate between the piezo elements 16B-1 to 16B-n.

The CPU 12A of the controller 12 outputs a selection signal to the switch ICs 16A that correspond to nozzles that are to discharge the model material.

In addition, the driving unit 18 generates a driving signal according to a droplet diameter of the model material that is discharged from the nozzles, and outputs the driving signal to the switch ICs 16A that correspond to nozzles that are to discharge the model material.

As a result of this, a driving signal that is output from the driving unit 18 is supplied to the piezo elements 16B that correspond to the switch ICs 16A to which the selection signal is output, and the model material is discharged from the nozzles.

Figure 3:
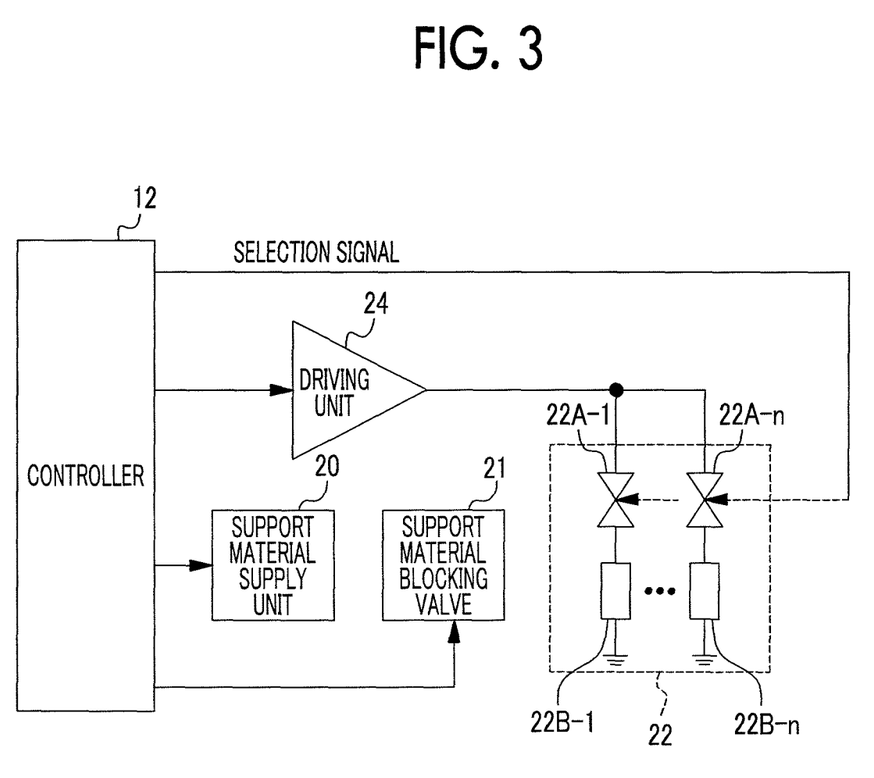
FIG. 3 is configuration drawing of a support material discharging head.

In addition, FIG. 3 shows a specific configuration of the support material discharging head 22. Additionally, since the configuration of the support material discharging head 22 is the same as the configuration of the model material discharging head 16 shown in FIG. 2, description thereof will be omitted.

Figure 4:
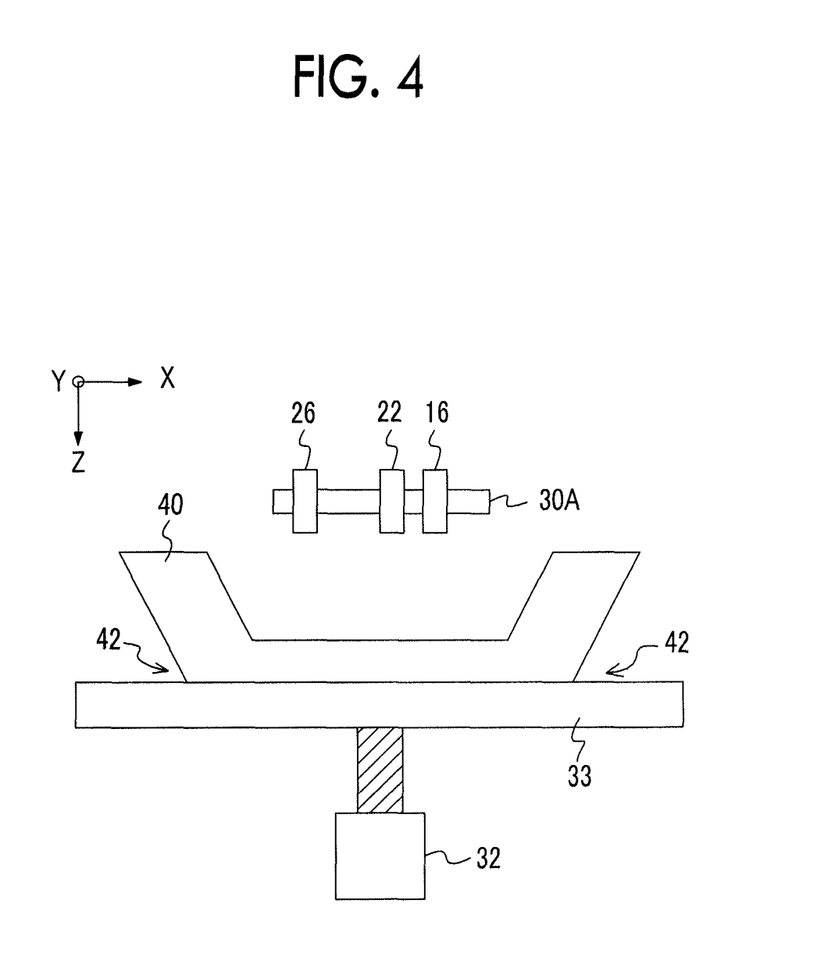
FIG. 4 is a side view of a 3D printer.

As shown in FIG. 4, the model material discharging head 16, the support material discharging head 22 and the UV light source 26 are attached in this order to a scanning shaft 30A with which the scanning unit 30 is provided. Accordingly, the model material discharging head 16, the support material discharging head 22 and the UV light source 26 are scanned in synchronization. The support material discharging head 22 and the UV light source 26 are attached to the scanning shaft 30A with an interval of a predetermined distance. Additionally, the positions of the model material discharging head 16 and the support material discharging head 22 may be the reverse of those described above. That is, in FIG. 4, the support material discharging head 22 is attached to a UV light source 26 side, but the model material discharging head 16 may be attached to the UV light source 26 side.

Figure 5:
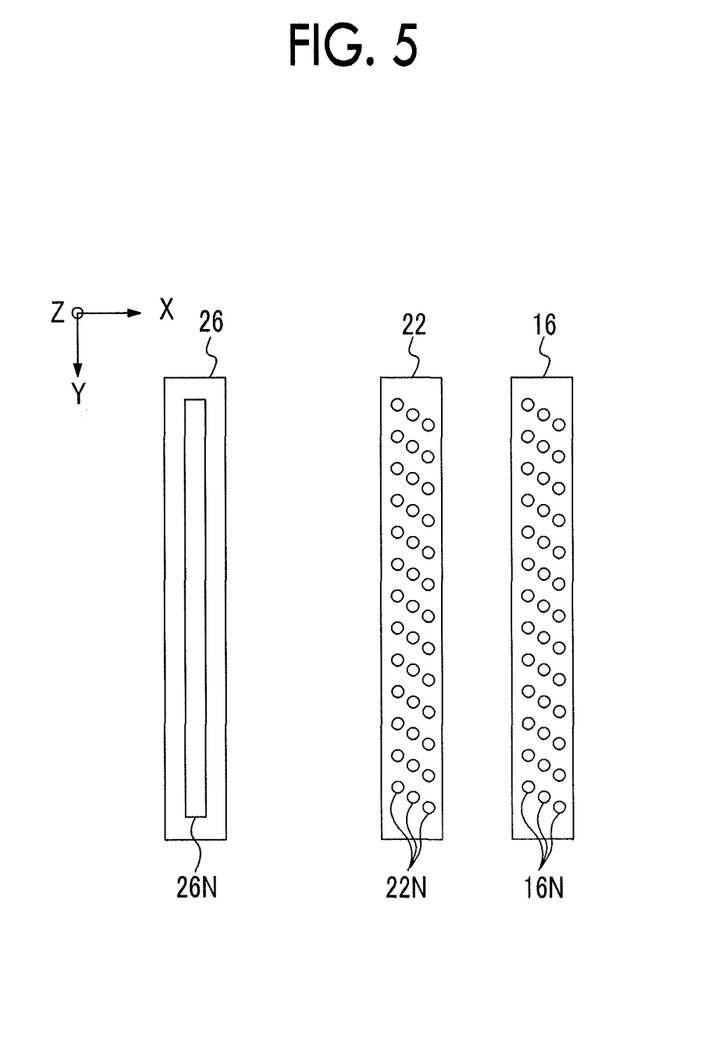
FIG. 5 is a bottom view of the model material discharging head, the support material discharging head and a UV light source.

In this instance, FIG. 5 shows a bottom view of the model material discharging head 16, the support material discharging head 22 and the UV light source 26, that is, a view that is viewed from a lower side toward an upper side in a Z direction in FIG. 4. As shown in FIG. 5, the model material discharging head 16, the support material discharging head 22 and the UV light source 26 have longitudinal shapes in which a Y direction is a longitudinal direction. Further, the lengths in the Y direction of the model material discharging head 16, the support material discharging head 22 and the UV light source 26 are lengths that are at least greater than or equal to the width of the three-dimensional shaped product that is to be formed.

The model material discharging head 16 is provided with multiple nozzles 16N that are disposed in two-dimensional shapes along the Y direction, and the model material is discharged from the nozzles 16N that are to discharge the model material. Additionally, the nozzles 16N may be disposed in one dimensional shapes along the Y direction.

The support material discharging head 22 is provided with multiple nozzles 22N that are disposed in two-dimensional shapes along the Y direction, and the support material is discharged from the nozzles 22N that are to discharge the support material. Additionally, the nozzles 22N may be disposed in one dimensional shapes along the Y direction.

The UV light source 26 is provided with an opening 26N in which the Y direction is set as a longitudinal direction, and UV light in which the Y direction is set as a longitudinal direction is emitted from the opening 26N.

The scanning unit 30 drives the scanning shaft 30A so that the model material discharging head 16, the support material discharging head 22 and the UV light source 26 move in an X direction, that is, scan with one dimension.

Additionally, the model material discharging head 16, the support material discharging head 22 and the UV light source 26 may be set not to have a longitudinal shape, and may scan with two dimensions in the X direction and the Y direction.

The shaping stand elevating unit 32 causes a shaping stand 33, which is shown in FIG. 4, to ascend and descend in the Z axis direction. The CPU 12A controls the model material discharging head 16, the support material discharging head 22 and the UV light source 26 so that the model material and the support material are discharged onto the shaping stand 33, and the discharged model material and support material are irradiated with UV light when a three-dimensional shaped product is formed.

In addition, the CPU 12A controls the scanning unit 30 so that the model material discharging head 16, the support material discharging head 22 and the UV light source 26 scan in the X direction, and controls the shaping stand elevating unit 32 so that the shaping stand 33 gradually descends in the Z axis direction.

Additionally, the CPU 12A controls the shaping stand elevating unit 32 so that the model material discharging head 16, the support material discharging head 22 and the UV light source 26, and a three-dimensional shaped product on the shaping stand 33 do not contact with one another, and so that a distance in the Z axis direction from the model material discharging head 16, the support material discharging head 22 and the UV light source 26 to the three-dimensional shaped product on the shaping stand 33 is greater than or equal to a predetermined distance when the three-dimensional shaped product is formed.

The cleaning unit 34 has a function of cleaning by suctioning material that is attached to the nozzles of the model material discharging head 16 and the support material discharging head 22, or the like. For example, the cleaning unit 34 is provided in a retreat region outside a scanning range of the model material discharging head 16 and the support material discharging head 22, and executes cleaning after the model material discharging head 16 and the support material discharging head 22 retreat to the retreat region when cleaning is executed.

The storage unit 36 stores a driving program 36A, which will be described below, forming data 36B, and support material data 36C.

The CPU 12A reads and executes the driving program 36A that is stored in the storage unit 36. In addition, the driving program 36A may be stored on a recording medium such as a CD-ROM, and may be executed by being read by a CD-ROM drive or the like.

The communication unit 38 is an interface for performing data communication with an external device that outputs the forming data 36B of the three-dimensional shaped product.

The CPU 12A forms a three-dimensional shaped product by controlling the various functional units in accordance with the forming data 36B that is transmitted from an external device.

Figure 6:
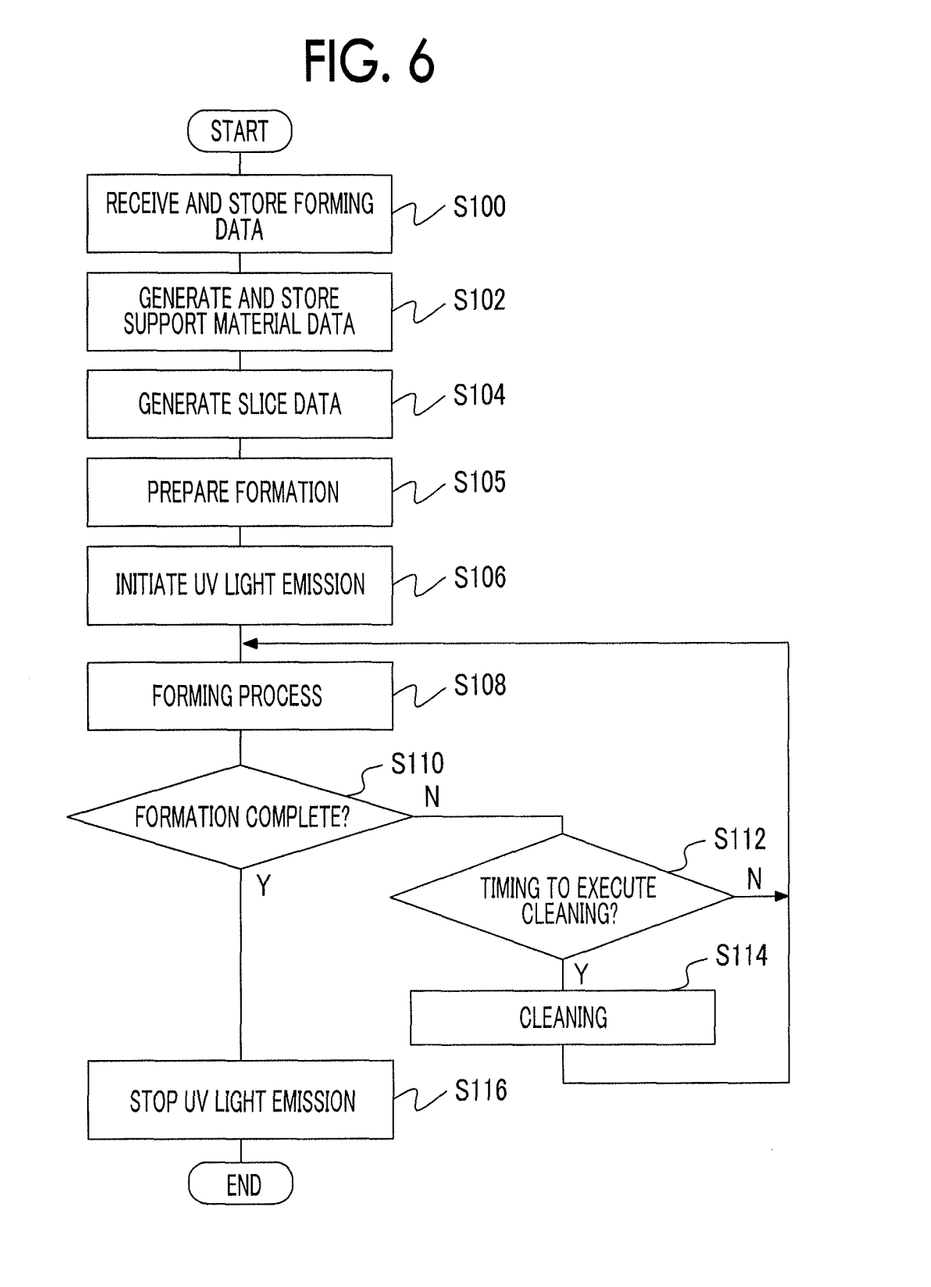
FIG. 6 is a flowchart of a process that is executed by a controller.

Next, the actions of the exemplary embodiment will be described. FIG. 6 shows a flowchart of the driving program 36A that is executed by the CPU 12A. Additionally, the process that is shown in FIG. 6 is executed when the preparation of a three-dimensional shaped product is instructed from an external device.

Figure 7A:
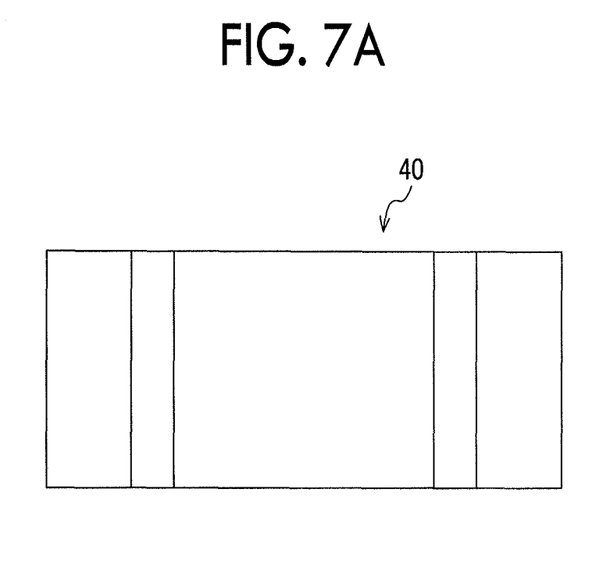
FIG. 7A is a plan view of a three-dimensional shaped product.
Figure 7B:
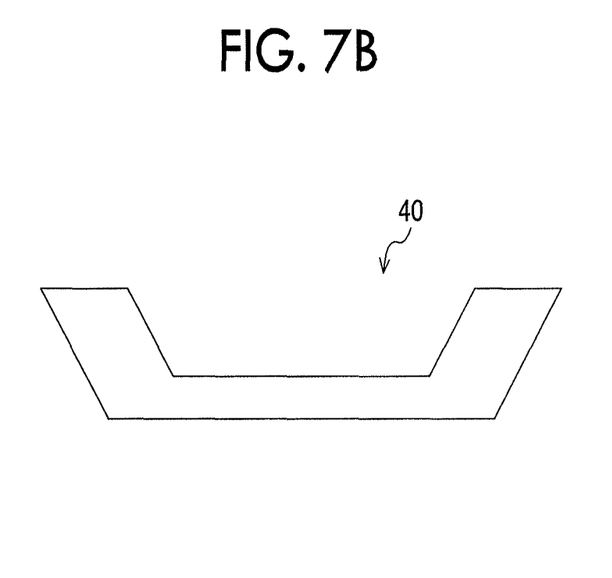
FIG. 7B is a side view of the three-dimensional shaped product.

In addition, in the exemplary embodiment, as an example, a case in which a three-dimensional shaped product 40 shown in FIGS. 7A and 7B is formed, will be described. FIG. 7A is a plan view of the three-dimensional shaped product 40, and FIG. 7B is a side view of the three-dimensional shaped product 40. As shown in FIG. 7B, the three-dimensional shaped product 40 has a shape in which the shapes of both end sides extend in a diagonally upward direction from the bottom when viewed from a side surface.

In Step S100, the forming data 36B of the three-dimensional shaped product 40 is received from an external device, and stored in the storage unit 36. For example, the STL (Standard Triangulated Language) format, which is a data format that expresses a three-dimensional shape, is used as the format of the forming data 36B of the three-dimensional shaped product 40, but the format is not limited to this.

Figure 8:
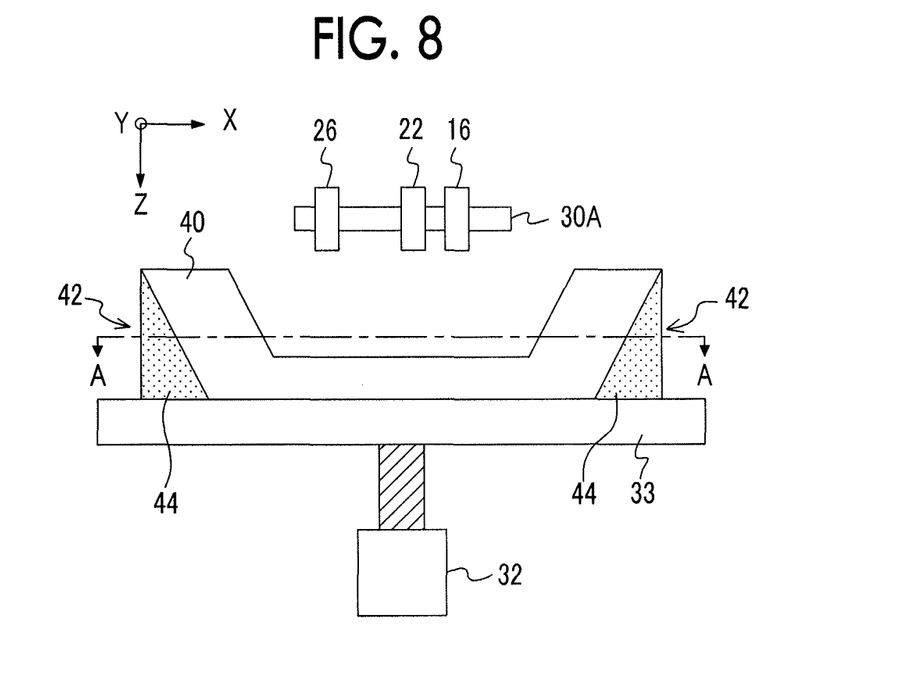
FIG. 8 is a side view of the 3D printer.

In Step S102, the support material data 36C is generated in accordance with the forming data 36B that is received in Step S100. The three-dimensional shaped product 40 is formed by laminating the model material on the shaping stand 33 but, as shown in FIG. 8, it is necessary for a region 42, in which a lower section is open space to be supported by the support material. Therefore, the region 42, in which a lower section is open space, is extracted by analyzing the forming data 36B. Further, the support material data 36C for discharging the support material into the region 42, in which a lower section is open space, is generated and stored in the storage unit 36.

In this manner, since the support material data 36C for discharging the support material is generated automatically, it is also possible for a user to omit an input operation such as indicating a region for discharging the support material.

Figure 9:
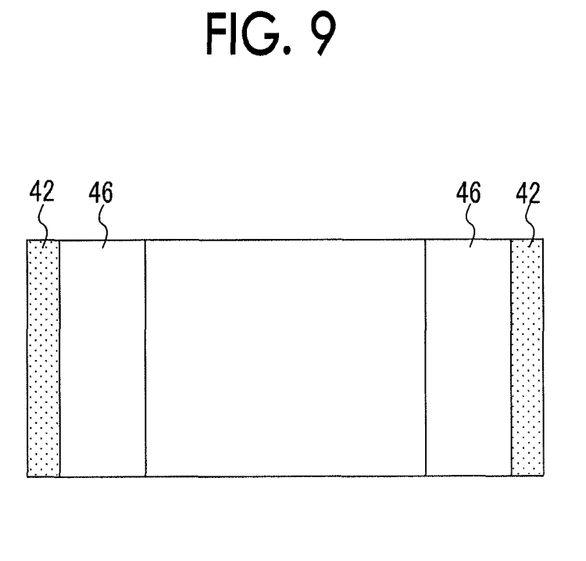
FIG. 9 is a sectional view taken along line IX-IX in FIG. 8.

In Step S104, slice data, in which the three-dimensional shaped product 40 is sliced at an XY plane in the Z axis direction, that is, in a direction of lamination, is generated based on the forming data 36B and the support material data 36C. As a result of this, multiple items of slice data, in which the three-dimensional shaped product 40 is sliced at the XY plane are generated in the direction of lamination. For example, slice data of sectional line A-A in FIG. 8 is shown in FIG. 9. As shown in FIG. 9, a support material 44 for supporting the model material is discharged into the region 42, and the model material is discharged in a region 46.

In Step S105, a forming preparation process of the three-dimensional shaped product is executed. More specifically, the model material blocking valve 15 and the support material blocking valve 21 are turned on, and the supply of the model material to the model material discharging head 16 and the supply of the support material to the support material discharging head 22 are initiated.

In addition, the driving unit 18 is controlled so as to supply a preliminary driving signal, which does not discharge the model material, but is for preventing thickening of the model material, to all of the nozzles of the model material discharging head 16. In the same manner, the driving unit 24 is controlled so as to supply a preliminary driving signal, which does not discharge the support material, but is for preventing thickening of the support material, to all of the nozzles of the support material discharging head 22.

In this instance, the kinds of driving signals that are output from the driving unit 18 which drives the model material discharging head 16, will be described. Additionally, since the kinds of driving signals that are output from the driving unit 24 which drives the support material discharging head 22, are the same as the types of driving signals that are output from the driving unit 18, description thereof will be omitted.

Figure 10:
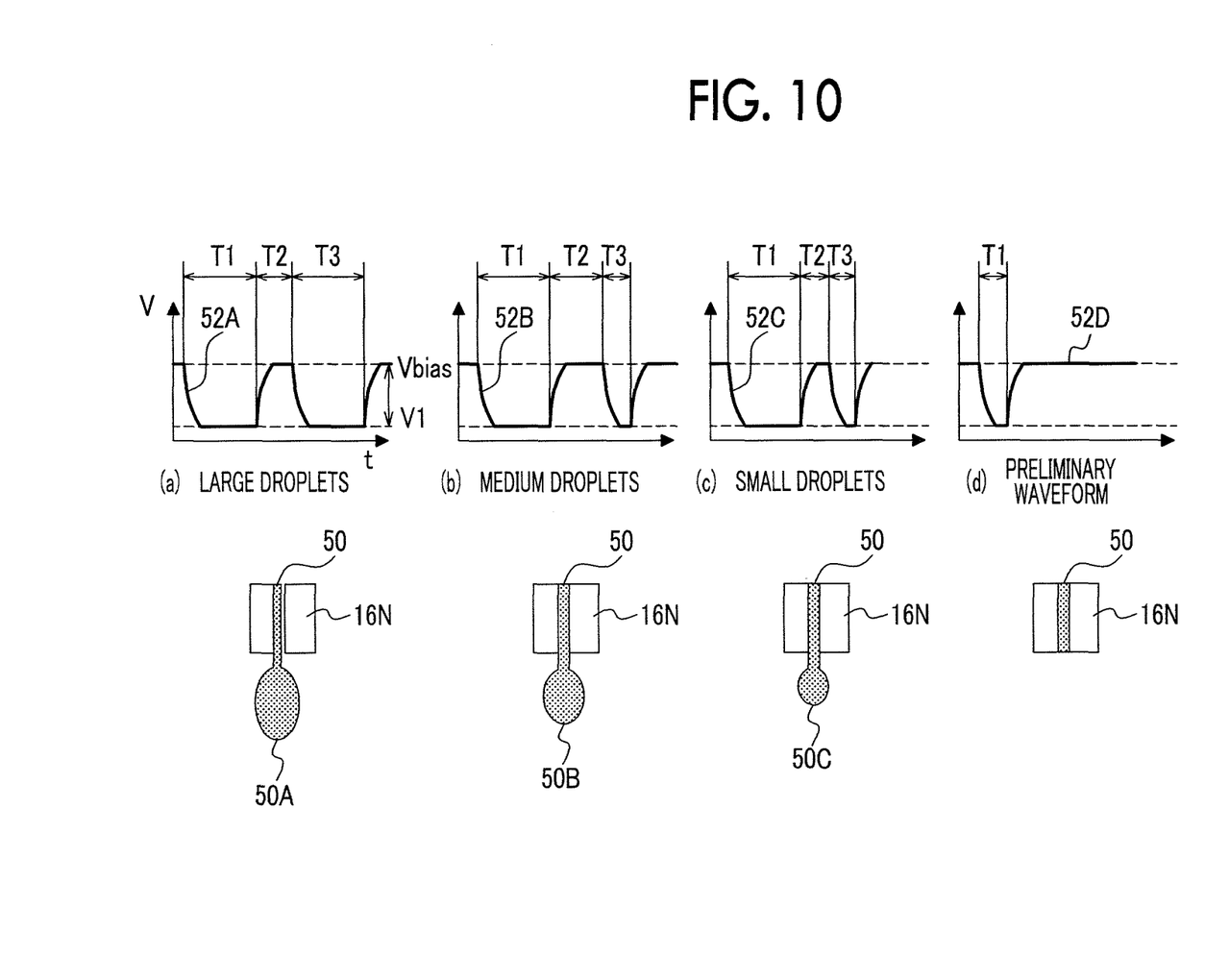
FIG. 10 is a waveform diagram of a driving signal.
Figure 11:
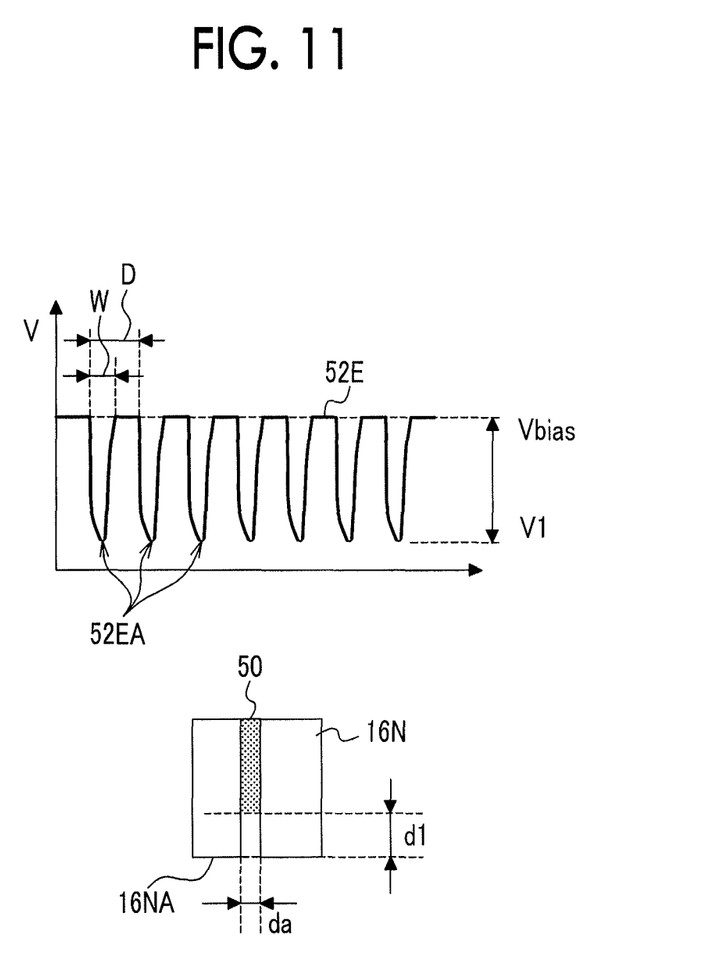
FIG. 11 is a waveform diagram of a draw-in driving signal.
Figure 12:
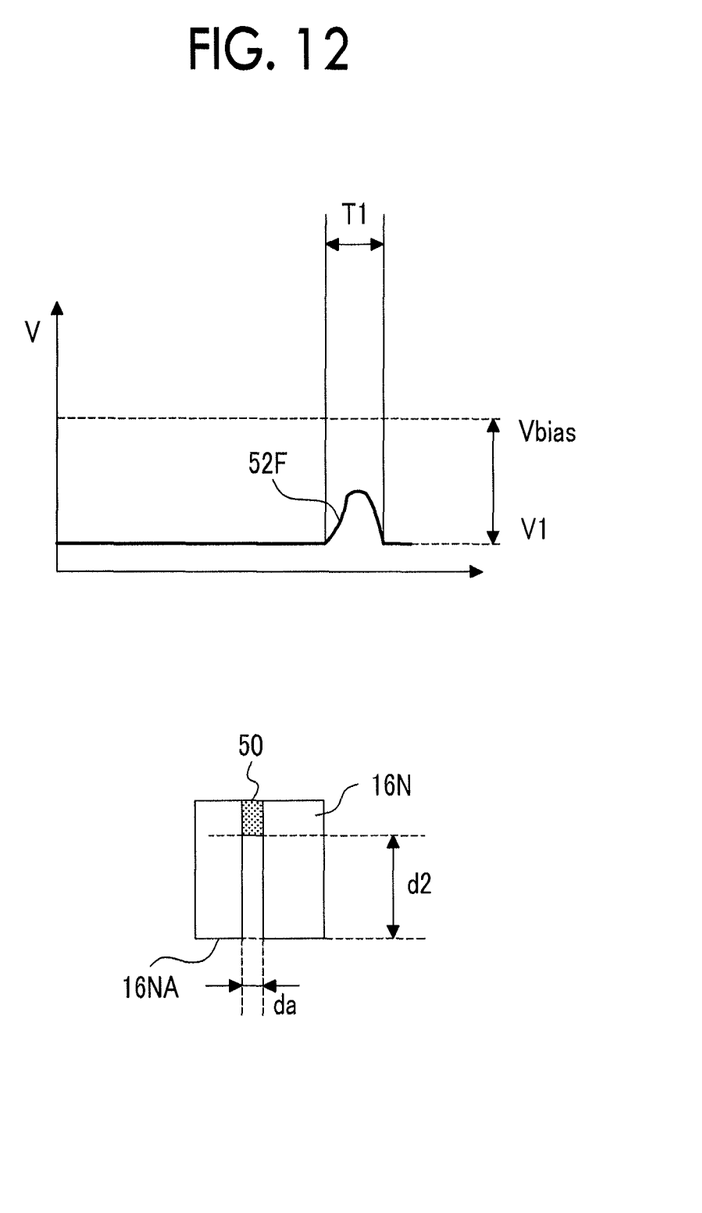
FIG. 12 is a waveform diagram of a pause driving signal.

The kinds of driving signals that are output from the driving unit 18 include, as shown in FIG. 10, (a) a driving signal 52A for discharging a model material 50 from the nozzles 16N of the model material discharging head 16 with large droplets 50A, (b) a driving signal 52B for discharging the model material 50 with medium droplets 50B, (c) a driving signal 52C for discharging the model material 50 with small droplets 50C, and (d) a preliminary driving signal 52D which does not discharge the model material 50, but is for preventing thickening of the model material 50, as shown in FIG. 11, a draw-in driving signal 52E for drawing the model material 50 in to an upper section in FIG. 11 from a discharge surface 16NA of the nozzles 16N, and as shown in FIG. 12, a pause driving signal 52F for drawing the model material 50 in to a greater extent than a case in which the draw-in driving signal 52E is supplied to the nozzles 16N in a case in which the model material discharging head 16 is paused. Additionally, in FIGS. 11 and 12, Vbias is approximately 28 V, and V1 is approximately 5V.

Accordingly, in Step S105, the driving unit 18 and the driving unit 24 are controlled so that the preliminary driving signal 52D that is shown in FIG. 10, is supplied to all of the nozzles of the model material discharging head 16 and the support material discharging head 22.

In Step S106, the driving unit 28 is instructed to drive the UV light source 26 so that the emission of UV light is initiated. As a result of this, the UV light source 26 initiates the emission of UV light.

In Step S108, a forming process is executed. That is, the scanning unit 30 is controlled so that the model material discharging head 16, the support material discharging head 22 and the UV light source 26 scan in the X direction, the shaping stand elevating unit 32 is controlled so that the shaping stand 33 gradually descends in the z axis direction, and the driving unit 18 which drives the model material discharging head 16, and the driving unit 24 which drives the support material discharging head 22 are controlled so that the model material and the support material are discharged in accordance with the slice data that is generated in Step S104.

That is, the driving unit 18 is controlled so that any one of the driving signal 52A for discharging the model material 50 with the large droplets 50A, the driving signal 52B for discharging the model material 50 with the medium droplets 50B, and the driving signal 52C for discharging the model material 50 with the small droplets 50C is output to nozzles that are to discharge the model material 50 according to the forming data. In addition, the driving unit 24 is controlled so that any one of the driving signal 52A for discharging the support material with large droplets, the driving signal 52B for discharging the support material with medium droplets, and the driving signal 52C for discharging the support material with small droplets is output to nozzles that are to discharge the support material according to the forming data.

In addition, the model material that is discharged from the model material discharging head 16 is cured by the UV light that is emitted from the UV light source 26, but if the UV light is reflected and scattered by the surface of the three-dimensional shaped product 40 and reaches the model material discharging head 16 and the support material discharging head 22, the model material and the support material inside the nozzles of the heads are cured, and this leads to nozzle clogging.

In such an instance, in the exemplary embodiment, in cases during the emission of UV light from the UV light source 26, the driving unit 18 and the driving unit 24 are controlled so as to supply the draw-in driving signal 52E to non-discharge nozzles of the model material and non-discharge nozzles of the support material. As a result of this, as shown in FIG. 11, the model material 50 is drawn in to an upper section from the discharge surface 16NA of the model material discharging head 16. In the same manner the support material is drawn in to an upper section from a discharge surface of the support material discharging head 22.

Additionally, as shown in FIG. 11, the draw-in driving signal 52E includes multiple pulse signals 52EA, and for example, a pulse width W of the pulse signals 52EA is set as less than or equal to a quarter of a specific period of the model material discharging head 16, and a pulse interval D of the pulse signals 52EA is set as less than or equal to a half of the specific period of the model material discharging head 16. As a result of this, approximately a half of a diameter da of the nozzles 16N becomes a draw-in amount d1. Additionally, the specific period of the model material discharging head 16 refers to a period in which it is easiest for the model material to be discharged. The same applies to the support material discharging head 22.

Figure 13:
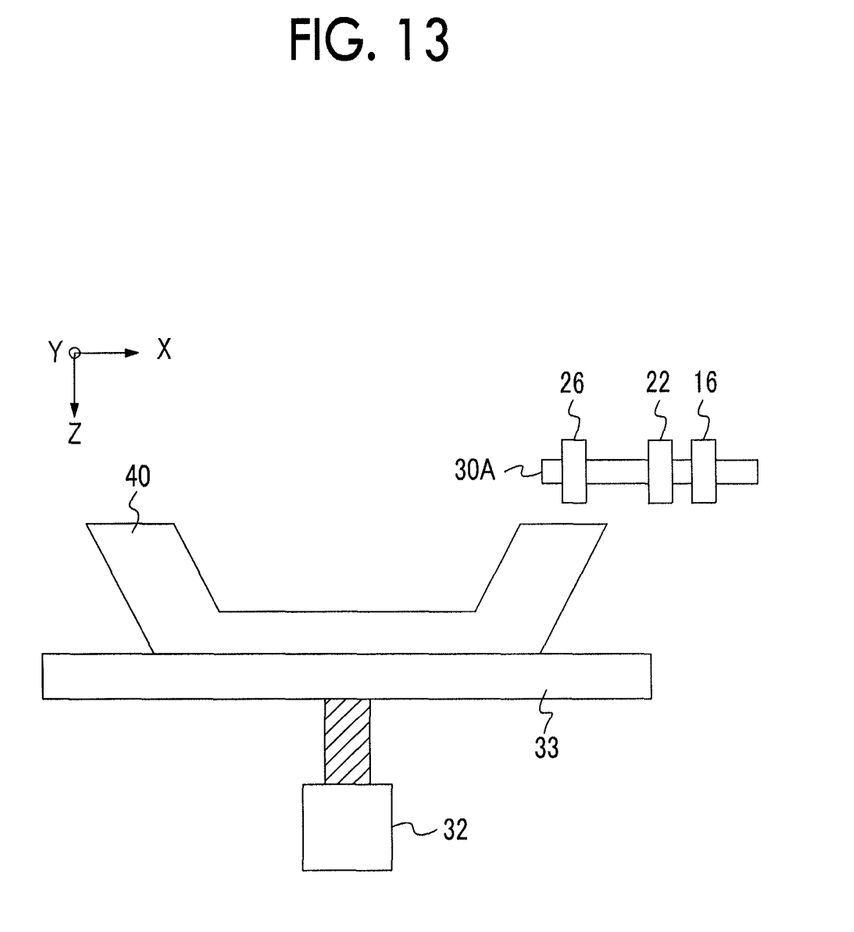
FIG. 13 is a side view of the 3D printer.

Furthermore, in a case in which the model material discharging head 16 is paused, the driving unit 18 is controlled so that a pause driving signal is supplied to all of the nozzles 16N. In this instance, "paused" is a state in which the discharge of the model material from the model material discharging head 16 is paused, and for example, as shown in FIG. 13, refers to a state in which the model material discharging head 16 is not above the shaping stand 33 when viewed from the Z direction. In addition, the same applies to the support material discharging head 22.

Additionally, the pause driving signals may be set to be supplied to the nozzles of the model material discharging head 16 and the support material discharging head 22 each time the model material discharging head 16 and the support material discharging head 22 are shifted from a region above the shaping stand 33, or the pause driving signal may be set to be supplied to the nozzles of the model material discharging head 16 and the support material discharging head 22 simultaneously in a case in which both the model material discharging head 16 and the support material discharging head 22 are shifted from a region above the shaping stand 33.

In addition, as shown in FIG. 12, a draw-in amount d2 of the model material 50 from the discharge surface 16NA in a case in which the pause driving signal 52F is supplied to the nozzles 16N is greater than the draw-in amount d1 of the model material 50 from the discharge surface 16NA in a case in which the draw-in driving signal 52E is supplied to the nozzles 16N. As a result of this, nozzle clogging is further suppressed. Additionally, the draw-in amount d2 is approximately two to three times the diameter da of the nozzles 16N.

In addition, as shown in FIG. 12, in the pause driving signal 52F, a voltage level does not remain as V1, but forms a waveform that has a single pulse. Therefore, thickening of the model material and the support material is suppressed.

In addition, in a case in which the model material discharging head 16 and the support material discharging head 22 are paused, the supply of the model material to the model material discharging head 16 and the supply of the support material to the support material discharging head 22 may be stopped by turning all of the model material blocking valves 15 and the support material blocking valves 21 off. As a result of this, a negative pressure is stabilized and retained, and a state in which the model material and the support material are drawn-up is stabilized and retained.

Figure 14:
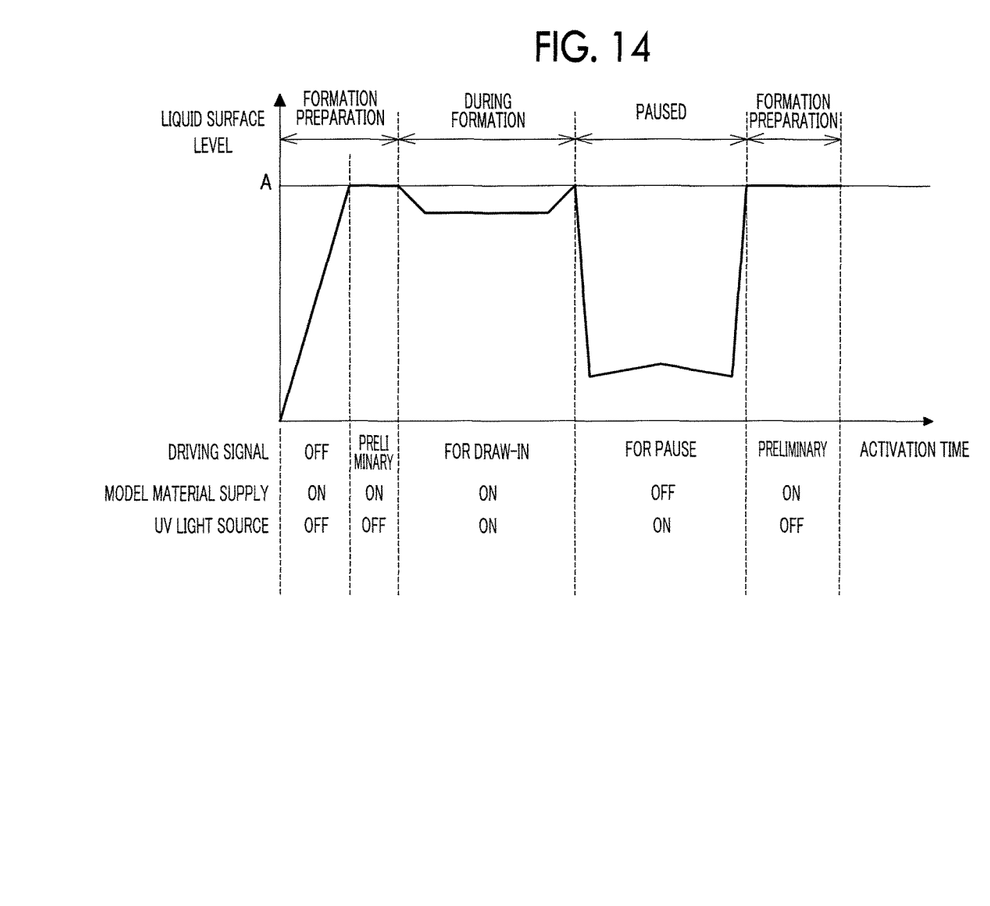
FIG. 14 is a view for describing a liquid surface level of nozzles.

FIG. 14 shows a liquid surface level of nozzles of the model material discharging head 16 in formation preparation, during formation and paused. A liquid surface level A corresponds to the discharge surface 16NA of the nozzles 16N. As shown in FIG. 14, in formation preparation, the driving signal is off, the supply of the model material, that is, the model material blocking valve 15, is on, and the UV light source 26 is off, and the liquid surface level approaches the liquid surface level A as a result of the supply of the model material being initiated. Further, in a case of being during formation in which the liquid surface level reaches the liquid surface level A, the preliminary driving signal 52D is supplied, and the discharge of the model material is subsequently initiated, the draw-in driving signal 52E is supplied to nozzles from which the model material is not discharged. As a result of this, the model material is drawn in from the liquid surface level A. Further, in a case in which the model material discharging head 16 is paused, the pause driving signal 52F is supplied to the nozzles and the supply of the model material is blocked. As a result of this, the model material is drawn in more than a case in which the draw-in driving signal 52E is supplied to the nozzles. Further, when the formation is complete, the UV light source 26 is turned off, the formation preparation state is entered and the preliminary driving signal 52D is supplied.

In this manner, the draw-in driving signal 52E is only supplied to non-discharge nozzles of the model material and the support material during formation, that is, during discharge of the model material and the support material, and during a pause, that is, in a case in which the discharge of the model material and the support material is stopped, the pause driving signal 52F is supplied to all of the nozzles, and all of the model material blocking valves 15 and the support material blocking valves 21 are turned off.

In Step S110, it is determined whether or not the formation of the three-dimensional shaped product 40 is complete, and the process moves to Step S112 if the formation is not complete and moves to Step S116 if the formation is finished.

In Step S112, it is determined whether or not it is a timing to execute cleaning of the model material discharging head 16 and the support material discharging head 22. Further, in a case in which it is a timing to execute cleaning, the process moves to Step S114. Meanwhile, in a case in which it is not timing to execute cleaning, the process moves to Step S108, and the forming process continues.

For example, each time a predetermined period of time elapses, each time a predetermined amount of at least one of the model material and the support material is consumed, or the like may be included as examples of a timing to execute cleaning, but the timing is not limited to these examples.

In a case in which each time a predetermined period of time elapses is set as the timing to execute cleaning, for example, it is preferable that the period of time is changed to various periods of time, states of clogging of the heads are measured, and the timing be set to the longest period of time during which head clogging does not occur. The shorter the period of time is, the larger a number of cleans becomes, and therefore, an amount of time until the forming process is complete becomes longer. As a result of this, unnecessary cleaning is suppressed.

In Step S114, the scanning unit 30 is instructed so that the model material discharging head 16 and the support material discharging head 22 move to the retreat region, and the cleaning unit 34 is instructed so that cleaning of the model material discharging head 16 and the support material discharging head 22 are executed. As a result of this, the model material discharging head 16 and the support material discharging head 22 move to the retreat region, and the cleaning unit 34 cleans the model material discharging head 16 and the support material discharging head 22. Additionally, in a case in which each time a predetermined amount of at least one of the model material and the support material is consumed, is set as the timing to execute cleaning, the cleaning may be configured so that only a head that discharges the material of which the predetermined amount has been consumed, is cleaned.

In Step S116, the UV light source 26 is instructed to stop the emission of UV light. As a result of this, the UV light source 26 stops the emission of UV light.

Additionally, in the exemplary embodiment, a case in which the draw-in driving signal 52E and the pause driving signal 52F are supplied to both the model material discharging head 16 and the support material discharging head 22 is described, but the draw-in driving signal 52E and the pause driving signal 52F may be supplied to the head that is closer to the UV light source 26 only.

In addition, in the exemplary embodiment, a case in which the present invention is applied to a 3D printer is described, but the present invention may be applied to a 2D printer as an ink jet printer. In this case, it is sufficient if the support material discharging head 22 is omitted, and the present invention is applied to an ink discharging head that discharges an ultraviolet curable ink in place of the model material discharging head 16.

In addition, in the exemplary embodiment, a case in which the shaping stand 33 gradually descends in the Z axis direction while the model material discharging head 16 and the like scan in the X direction, is described, but the shaping stand 33 may be fixed, and the model material discharging head 16 and the like may gradually rise in the z axis direction while scanning in the X direction. In addition, both the model material discharging head 16 and the like and the shaping stand 33 may move so as to become separated from one another in the z axis direction.

Additionally, the configuration of the 3D printer 10 that is described in the exemplary embodiment is an example (refer to FIG. 1), and naturally, unnecessary portions may be eliminated and new portions may be added within a range that does not depart from the scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A driving device of a liquid droplet discharging head comprising:
    a driving unit that drives a liquid droplet discharging head which includes a plurality of nozzles, which discharge an ultraviolet ray curable liquid, as liquid droplets, the ultraviolet ray curable liquid being cured by being irradiated with ultraviolet rays; and
    a control unit that controls the driving unit so that, among the plurality of nozzles, a draw-in driving signal for drawing the liquid in from a discharge surface of non-discharge nozzles of the liquid droplets is supplied to the non-discharge nozzles while ultraviolet rays from an ultraviolet ray light source, which irradiates liquid droplets discharged from the liquid droplet discharging head with ultraviolet rays, are being emitted.

2. The driving device of a liquid droplet discharging head according to claim 1, wherein:
    the control unit controls the driving unit so that a pause driving signal for drawing the liquid in from the discharge surface is supplied to all of the nozzles when the liquid droplet discharging head is paused, and
    a draw-in amount of the liquid from the discharge surface in a case in which the pause driving signal is supplied to the nozzles is greater than a draw-in amount of the liquid from the discharge surface in a case in which the draw-in driving signal is supplied to the nozzles.

3. The driving device of a liquid droplet discharging head according to claim 2,
wherein the control unit stops supplying the liquid to the liquid droplet discharging head when the liquid droplet discharging head is paused.

4. The driving device of a liquid droplet discharging head according to claim 3, wherein
the draw-in driving signal includes a plurality of pulse signals,
a pulse width of the pulse signals is set as a quarter of a specific period of the liquid droplet discharging head or less, and
a pulse interval of the plurality of pulse signals is set as a half of the specific period or less.

5. The driving device of a liquid droplet discharging head according to claim 2, wherein
the draw-in driving signal includes a plurality of pulse signals,
a pulse width of the pulse signals is set as a quarter of a specific period of the liquid droplet discharging head or less, and
a pulse interval of the plurality of pulse signals is set as a half of the specific period or less.

6. The driving device of a liquid droplet discharging head according to claim 1, wherein
the draw-in driving signal includes a plurality of pulse signals,
a pulse width of the pulse signals is set as a quarter of a specific period of the liquid droplet discharging head or less, and
a pulse interval of the plurality of pulse signals is set as a half of the specific period or less.

7. A printer comprising:
a liquid droplet discharging head that includes a plurality of nozzles, which discharge an ultraviolet ray curable liquid, as liquid droplets, the ultraviolet ray curable liquid being cured by being irradiated with ultraviolet rays;
an ultraviolet ray light source that irradiates liquid droplets discharged from the liquid droplet discharging head with ultraviolet rays; and
the driving device of a liquid droplet discharging head according to claim 1.

8. The printer according to claim 7, further comprising:
a support material discharging head that discharges a support material, which is an ultraviolet ray curable support material that is cured by being irradiated with ultraviolet rays, and which aids in the formation of a three-dimensional shaped product that is formed using a model material,
wherein the liquid is the model material for forming the three-dimensional shaped product.

9. A non-transitory computer readable medium that stores a driving program of a liquid droplet discharging head, which causes a computer to function as a control unit of the driving device of a liquid droplet discharging head according to claim 1.

* * * * *